Feb. 2, 1960

R. W. KETCHLEDGE 2,923,476

SIGNAL COMPARISON SYSTEM

Filed April 10, 1957

3 Sheets-Sheet 1

INVERTER

INVENTOR
R. W. KETCHLEDGE
BY [signature]
ATTORNEY

Feb. 2, 1960 R. W. KETCHLEDGE 2,923,476

SIGNAL COMPARISON SYSTEM

Filed April 10, 1957 3 Sheets-Sheet 2

INVENTOR
R. W. KETCHLEDGE

BY [signature]

ATTORNEY

Feb. 2, 1960 R. W. KETCHLEDGE 2,923,476

SIGNAL COMPARISON SYSTEM

Filed April 10, 1957

3 Sheets-Sheet 3

INVENTOR
R. W. KETCHLEDGE

BY

ATTORNEY

United States Patent Office 2,923,476

Patented Feb. 2, 1960

2,923,476

SIGNAL COMPARISON SYSTEM

Raymond W. Ketchledge, Whippany, N.J., assignor to Bell Telephone Laboratories, Incorporated, New York, N.Y., a corporation of New York Application April 10, 1957, Serial No. 651,864

27 Claims. (Cl. 235—177)

Figure 1:
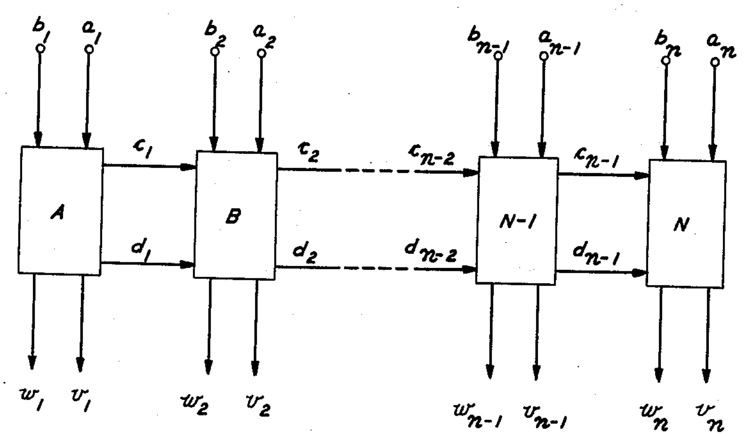

This invention relates to electrical signal comparison systems and more particularly to systems for comparing binary code signals.

The invention may be exemplified in its practical application in systems employing binary codes; that is, systems in which a code group consists of a numerical sequence of any number of 0's or 1's in any permutation arrangement. Therefore, any individual element of such a code consists of a 0 or 1. These 0 and 1 elements may be differentiated from each other in practical arrangements by conditions of current and no current, positive current and negative current, or by other pairs of suitable conditions.

In my application, Serial No. 581,175, filed April 27, 1956, a binary number comparison system is disclosed which provides an indication of the relative magnitudes or sign of the difference between two multidigit binary numbers. The instant invention provides an indication of the magnitude of the difference between two numbers as well as their relative magnitudes.

The prior art discloses computing circuits capable of performing various mathematical functions with multidigit binary numbers such as addition and subtraction. In performing these functions such circuits operate initially on the least significant digit of each number and proceed digit-by-digit toward the most significant digits, after which the resultant is obtained. It is apparent that where speed is a critical factor, the delay inherent in completing this digit-by-digit comparison to achieve the desired result may render such circuits inadequate.

For example, high speed storage applications of cathode ray tubes depend upon rapid and accurate positioning of an electron beam in accordance with input information fed to the deflection circuitry of the tube in parallel binary form. In order to assure beam position accuracy, a monitoring system may be employed in accordance with that disclosed in the application of C. W. Hoover, Jr. and R. W. Ketchledge, Serial No. 581,073, filed April 27, 1956, now Patent No. 2,855,540. Output signals in parallel binary form are received from a monitor tube target indicative of the beam position. These signals are compared with the monitor input information signals, and resultant signals are fed to the tube's deflection circuitry to correct any errors in beam position. Direct analog subtraction as shown in the prior art would severely hinder the accuracy and speed of this operation.

The invention of my application Serial No. 581,175, filed April 27, 1956 may be utilized in the above example to perform the required comparison of two binary numbers and to provide an indication of the larger number so as to direct the deflection correction in the proper direction. By employing continuous feedback comparisons, correction signals are provided until the difference between the input and output binary numbers is reduced to zero, thus assuring accurate beam positioning. The delay encountered in reaching the condition of equality by utilization of this system, however, necessarily curtails the speed of operation, and thus may prove inadequate in some extremely high speed applications.

The present invention, in providing an indication of the magnitude of the difference between two multidigit binary numbers, as well as the relative magnitude, obviates the plurality of comparisons required in comparison systems yielding relative magnitude alone, thus improving operating speed.

It is an object of this invention to provide a binary number comparison system.

It is another object of this invention to compare two binary numbers of the same order and to provide one of two output characteristics dependent upon the larger of the compared numbers and of a magnitude commensuate with the difference between the numbers.

It is another object of this invention to compare two binary numbers of different binary code forms so as to provide an indication of their relative magnitudes and the approximate difference in magnitudes.

The above objects are attained in accordance with the invention by the application to a comparator network of each of the various digits of a first binary number as one of two electrical signals, each digit being allotted a distinct input in one of several comparison positions of the comparator network. Each of the various digits of a second binary number to be compared with the first binary number is applied as one of two electrical signals to another input in the same position as the signal for the digit of corresponding significance in the former number. Thus the most significant digit in each binary number is applied to one position of the comparator via separate leads, succeeding digits of lesser significance being applied to other positions thereof in similar fashion. The various positions are interconnected and also have individual outputs coupled to a pair of common outputs which collectively in certain embodiments and severally in other embodiments yield the relative magnitude and the difference in magnitude of the compared binary numbers.

In the illustrative embodiments of this invention, each position of the comparator comprises a series of logic circuits of the AND and OR variety. Logical AND circuits are variously known as gates or coincidence circuits and are employed generally throughout computer operation. Generally a logical AND circuit is a circuit having a plurality of inputs and a single output and is so designed that an output signal is obtained only when like signals of a predetermined type are received simultaneously on each of the inputs. A logical OR circuit is a circuit having a plurality of inputs and a single output and is designed to produce an output signal when signals of a predetermined type are received at one or more inputs.

A conventional subtractor circuit, as known in the art, proceeds in serial fashion to compare corresponding digits beginning with the least significant digits. The resultant is obtained only after all digit comparisons from least to most significant are completed in turn. For example, to subtract 75 from 123 in conventional fashion, the least significant digit (5) of the subtrahend is subtracted from the least significant digit (3) of the minuend, borrowing ten from the next more significant digit (2) of the minuend to provide a resultant of 8 for the least significant digit comparison. This resultant provides no indication of the relative magnitudes or the difference magnitude of the two numbers, which results are not obtained until the most significant digits have been compared. Similarly, a subtractor circuit as known in the art, operating on the same numbers in binary code form, proceeds through each digit comparison, beginning with the least significant, before any accurate indication of the final resultant can be obtained.

In accordance with my invention, binary digit comparisons are conducted beginning with the most significant digits. Thus, for the above example the minuend 123=1111011 in conventional binary form, the subtrahend 75=1001011 in conventional binary form, and the resultant 48=0110000 in conventional binary form.

The most significant digit is a 1 in both binary numbers, indicating merely that both seven digit binary numbers are between 64 and 127 inclusive. The next digit is a 1 in the minuend and a 0 in the subtrahend. This first most significant digit mismatch indicates that the minuend is larger than the subtrahend and that the minuend lies between 96 and 127 while the subtrahend lies between 64 and 95 and the resultant is between +32 and +63. Such information is adequate to indicate the range of difference between the compared numbers as well as their relative magnitudes. Thus, utilizing my invention in this example, comparisons in two positions, beginning with the corresponding digits applied to the most significant digit comparison position, are sufficient to determine information which could be obtained by conventional subtractors only after conducting a comparison in each digit position.

I have found that the approximate difference magnitude of two compared binary code numbers may be derived from a binary weighting assigned to the position presenting the most significant digit mismatch and binary weightings assigned to all digit positions of lesser significance. Each binary digit position is assigned an analog value or weighting corresponding to its binary significance. For example, in a seven digit binary number the digit positions are assigned binary weightings of 64, 32, 16, 8, 4, 2 and 1 in the respective order of significance. Thus, if the most significant digit mismatch occurs in the fourth most significant digit position of two seven digit binary numbers undergoing comparison, the magnitude of their difference may be derived from the binary weighting assigned to the fourth digit position, 8, and the binary weightings assigned the fifth, sixth and seventh digit positions, 4, 2 and 1, respectively.

In my copending application, Serial No. 651,897 I have disclosed circuitry to provide the exact magnitude of the difference between the compared numbers. The instant invention discloses means for indicating the approximate magnitude of the difference, thereby providing increased speed of operation over relative magnitude only systems and with fewer logical components than required in exact difference magnitude systems.

To approximate the difference magnitude in accordance with the specific embodiments of this invention, the comparison circuit detects the one digit position which contributes the most to the difference and bases its output thereon, disregarding all other digit positions. Thus, I have found that the best approximation of the difference between two numbers in conventional binary code is provided by the weighting assigned to one of the digit positions and is substantially in accordance with the following rules:

(1) If the digits match in the position immediately following the most significant digit mismatch or are mismatched in the same fashion, provide an output in accordance with the weighting assigned the most significant digit mismatch position.

(2) If the digits in the position or consecutive positions following the most significant digit mismatch are mismatched in opposite fashion to that of the most significant mismatched digits, provide an output in accordance with the weighting assigned the last of such oppositely mismatched digit positions.

As an illustration of these rules consider the following examples;

I

| | | 64 | 32 | 16 | 8 | 4 | 2 | 1 |
|---|---|---|---|---|---|---|---|---|
| Weighting Position | | A | B | C | D | E | F | N |
| 56 | = | 0 | 1 | 1 | 1 | 0 | 0 | 0 |
| 48 | = | 0 | 1 | 1 | 0 | 0 | 0 | 0 |
| +8 | = | | | | +x | | | |

In Example I, the most significant digit mismatch in the conventional binary code numbers occurs in position D, is positive, and is followed by a match in position E, so that in accordance with rule 1, an output is provided with the weighting (8) of the mismatch position D.

II

| | | 64 | 32 | 16 | 8 | 4 | 2 | 1 |
|---|---|---|---|---|---|---|---|---|
| Weighting Position | | A | B | C | D | E | F | N |
| 48 | = | 0 | 1 | 1 | 0 | 0 | 0 | 0 |
| 15 | = | 0 | 0 | 0 | 1 | 1 | 1 | 1 |
| +33 | = | | +x | | | | | |

In Example II, the most significant digit mismatch occurs in position B, is positive, and is followed by a positive mismatch in position C, so that in accordance with rule 1, an output is provided with the weighting (32) of the former position. Mismatches in less significant digit comparison positions may also produce outputs, but only the output having the largest binary weighting is considered, other outputs being inhibited.

III

| | | 64 | 32 | 16 | 8 | 4 | 2 | 1 |
|---|---|---|---|---|---|---|---|---|
| Weighting Position | | A | B | C | D | E | F | N |
| 33 | = | 0 | 1 | 0 | 0 | 0 | 0 | 1 |
| 31 | = | 0 | 0 | 1 | 1 | 1 | 1 | 1 |
| +2 | = | | + | | | | x | |

In Example III, the most significant digit mismatch again occurs in position B and is positive, but it is followed by a series of negative mismatches, so that in accordance with rule 2, an output is provided with the weighting assigned position F, which contains the last negative mismatch in the series of negative mismatches, or 2.

In each instance the polarity of the output, or relative magnitude of the compared numbers, is determined by the sense of the most significant digit mismatch.

Adaptation of th.s comparison system to various applications employing binary numbers requires that it be operable on the various binary number code forms. Thus, many applications utilize numbers in the conventional binary code while others employ a reflected binary code and still others a combinat.on of both codes. The various illustrative embodiments of this invention discussed hereinafter indicate the operation of the comparison system on the various binary codes and code combinations. It will be advantageous, however, to cons.der combinations of digits in other than conventional binary code with reference to their equivalents in binary code for which the above rules as to matches and mismatches of individual digit posit.ons apply.

It is a feature of this invention that signals representing two binary code numbers be applied to a series of logic circuits and an output signal ind.cative of the magnitude of their difference be derived from a selected one of the logic circuits.

It is a more specific feature of this invention that signals representing correspond.ng digits of two binary code numbers to be compared be applied to respective ones of a plurality of logic circuits, digit comparisons be conducted beginning with the most significant digit position, and an output signal indicative of the magnitude of the difference between the applied numbers be derived at a common output of the several logic circuits from a selected one of the logic circuits.

It is another feature of this invention that a selected one of two possible signals indicative of the larger of the two b.nary code numbers be derived from a selected one of the logic circuits.

It is a feature of one specific embodiment of this invention that an output signal indicative of the magnitude of the difference between the two input numbers be generated by a selected one of said logic circuits in a selected one of two outputs in accordance with the relative magnitude or sign of the difference between the two input numbers.

It is a feature of another specific embodiment of this invention that an output signal indicative of the magnitude of the difference between the two input numbers be generated in one output by a selected one of the logic circuits and that an output signal indicative of the relative magnitude or sign of the difference between said input numbers generated in another output by a selected one of the logic circuits.

Figures 2A, 2B:
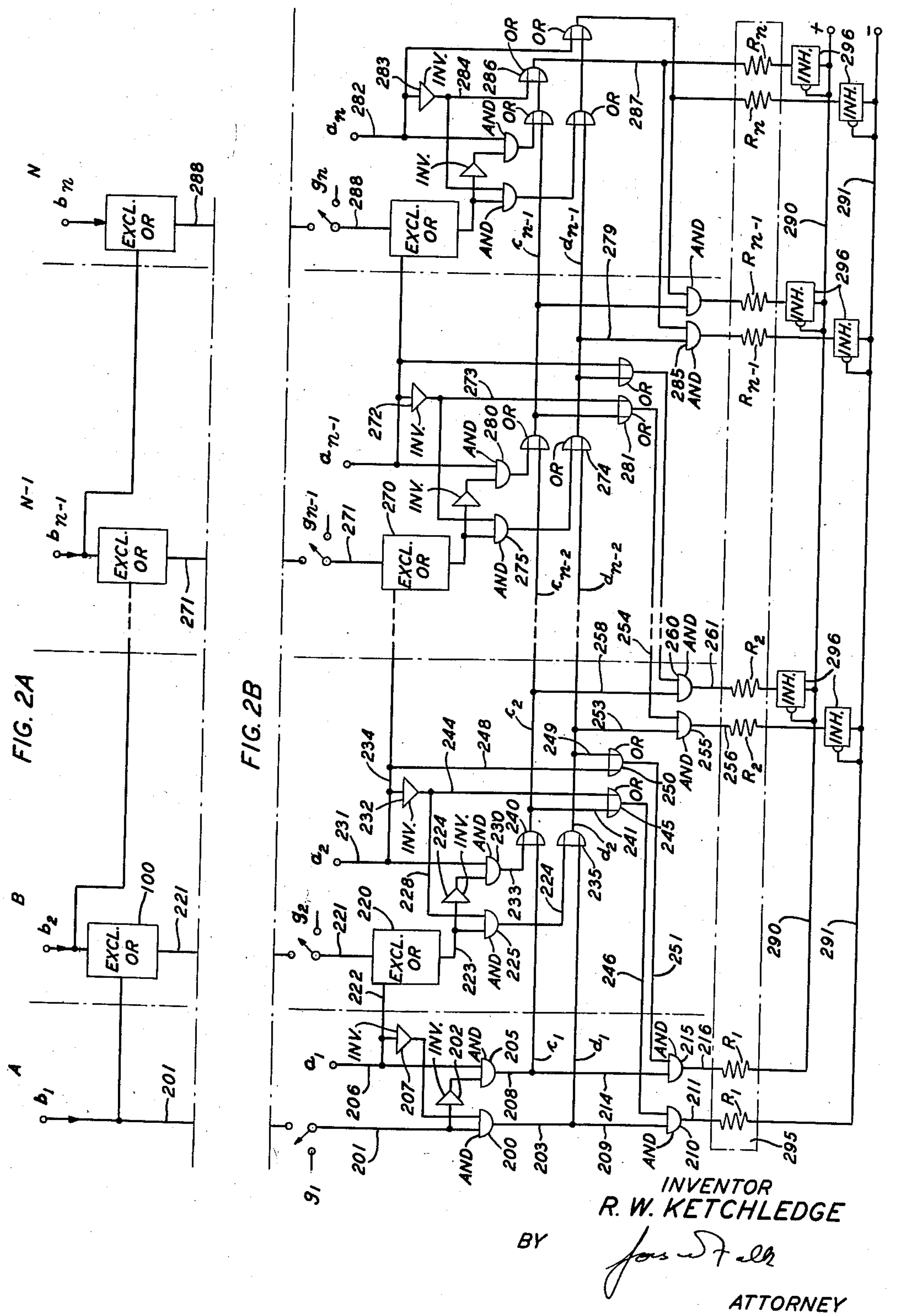
Figure 3:
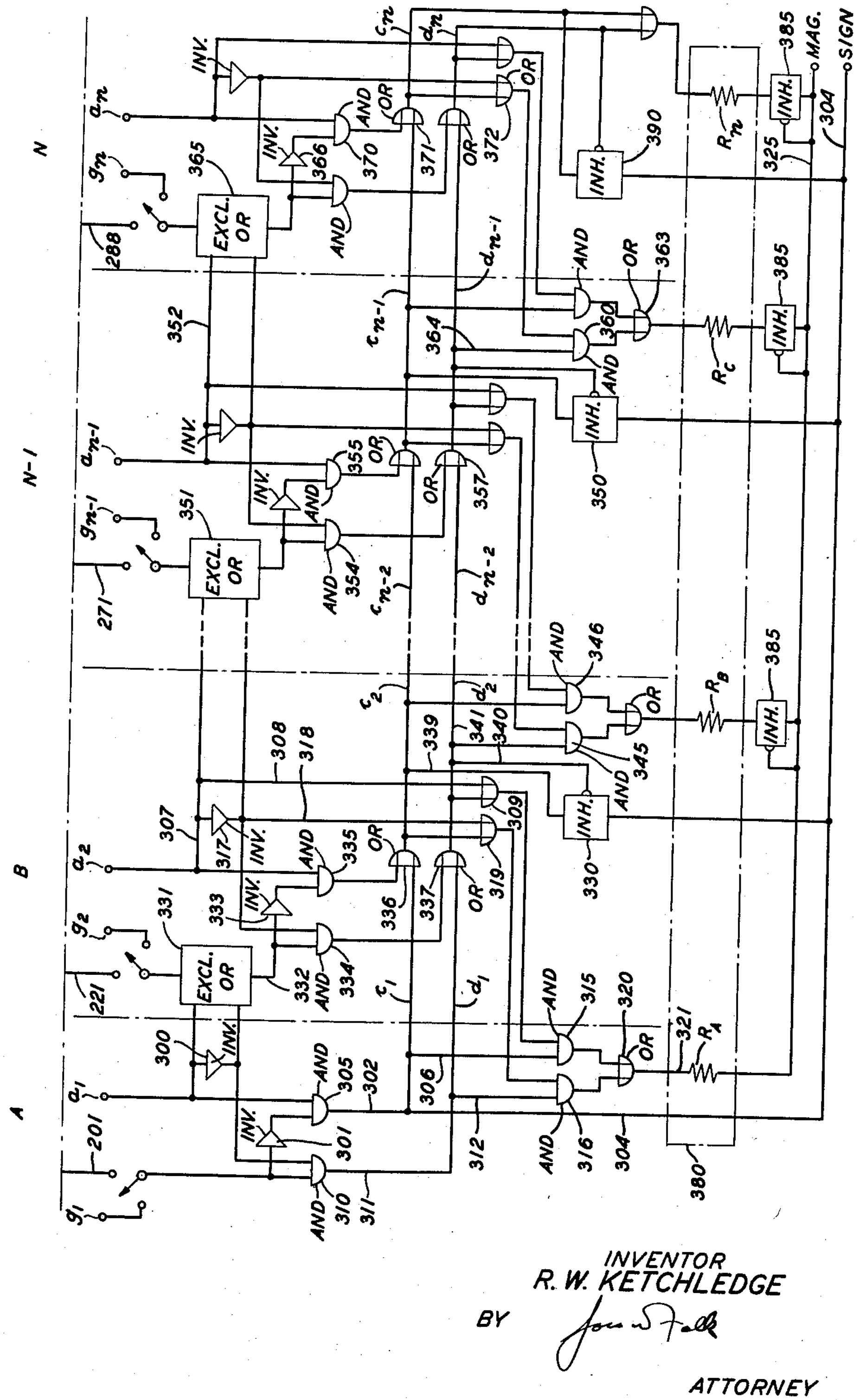

A complete understanding of this invention and of these and various other features thereof may be gained from consideration of the following detailed description and the accompanying drawing in which:

Fig. 1 is a diagrammatic representation in block form of the generalized circuit of the various specific illustrative embodiments of this invention;

Fig. 2, composed of portions A and B, is a diagrammatic representation of one specific illustrative embodiment of this invention;

Fig. 3 is a diagrammatic representation of another specific illustrative embodiment of this invention; and Fig. 4, composed of portions A through E, shows simplified schematic representations of various logic components which may be employed in the embodiments of Figs. 2 and 3.

Referring now to the drawing, Fig. 1 depicts the generalized form taken by the various illustrative embodiments of this invention. An arrangement of logic circuit comparison positions is utilized to compare the binary code number $a_1a_2 \ldots a_{n-1}a_n$ with the binary code number $b_1b_2 \ldots b_{n-1}b_n$. Corresponding digits of each number are applied to a distinct logic circuit position for comparison; thus, $a_1$ and $b_1$, the most significant digits in the binary numbers, are each applied to position A.

Each digit is applied as a selected one of two discrete voltage levels on the corresponding input leads. The two discrete input voltage levels represent the binary digits "one" and "zero," and the explanation hereinafter will allude to the condition of the circuit in terms of the presence of a "one" or a "zero."

The comparison conducted in position A may yield an indication of a positive mismatch in the digits compared and may signal this condition on lead $c_1$ to position B comparing the next most significant digits. Position A also may yield an indication of a negative mismatch on lead $d_1$ or may provide an indication of a match by failure to supply a signal on either of leads $c_1$ and $d_1$. Such indications will be described hereinafter as carries. Thus, a positive mismatch produces a positive carry and a negative mismatch a negative carry, which carries are operative on the logic circuit position comparing digits of the next lower order.

The remaining logic circuit positions B, . . . $N-1$ and N, conduct similar comparisons of digits of corresponding significane under the influence of carries from more significant digit comparisons. A selected one of the positions A . . . N will provide an output signal on one of the associated $w$ or $v$ leads, respectively, dependent upon the differences in magnitude of the two numbers as determined by comparisons in the individual positions. Likewise, an output of one of the positions indicates the relative magnitude of the two numbers.

The components utilized in each intermediate digit comparison position are identical so that the four positions shown in Fig. 1 are adequate to disclose a system comparing any multidigit binary numbers. With each additional digit in the input numbers, a position comparable to intermediate positions B and $N-1$ is added.

The generalized circuit of Fig. 1 may be adapted to comparison of binary numbers in any code form or combination of code forms. The circuit of Fig. 2, for example, compares a conventional binary code number with another number in conventional binary code or with a number in the reflected binary code.

Systems illustrating the reflected binary code are disclosed in the patent to F. Gray, No. 2,632,058, issued March 17, 1953. The reflected binary code has certain distinct advantages over the conventional binary code for many applications, due in part to its construction, such that successive numbers differ in only one code element or digit. The approximate magnitude comparison system receiving at least one number in reflected binary code requires fewer logic components to perform its function than is required if both input numbers are in conventional binary code. The general principles for comparing numbers in any binary code or combination of codes are the same, however, so that my invention is not to be deemed confined only to the schemes disclosed in the illustrative embodiments as adapted to particular codes.

The logic involved in the binary number comparison conducted in the circuit of Fig. 2 may be expressed in algebraic form, utilizing the terminology of Boolean Algebra, as follows:

Positive carry $c_i=c_{i+1}+a_i(a_{i+1}\oplus g_i)'$

Negative carry $d_i=d_{i+1}+a_i'(a_{i+1}\oplus g_i)$

Positive output $w_i=c_i(a_{i-1}+d_{i-1})$

Negative output $v_i=d_i(a'_{i-1}+c_{i-1})$

Where $a_i$ and $g_i$ designate the digit input signals from the compared numbers in conventional and reflected binary code form respectively applied to any selected comparison position $i$, $c_{i+1}$ and $d_{i+1}$ designate positive and negative carries respectively from the next more significant digit position, and $c_{i-1}$ and $d_{i-1}$ designate positive and negative carries respectively from the next lesser significant digit position.

Referring now to the circuit of Fig. 2, if the numbers to be compared are received in conventional binary code form, the digits of one of them are changed to reflected binary code form before comparison with the digits of the other. Thus, the digits of conventional binary code number $b_1b_2 \ldots b_{n-1}b_n$ are converted to reflected binary code form $g_1g_2 \ldots g_{n-1}g_n$ in the circuit of Fig. 2*a* for comparison with the conventional binary code number $a_1a_2 \ldots a_{n-1}a_n$.

Simply stated, in order to convert from conventional binary code form to reflected binary code form, a conventional binary code digit is reversed if the next more significant digit of the number in conventional binary code form is a "one." Each position other than position A in Fig. 2 is required to make the digital conversion in order to change from conventional to reflected binary code form.

The exclusive OR circuit 100 in position B, Fig. 2*a*, for example, receives the digit $b_2$ in conventional binary code form. Circuit 100 also receives the next more significant digit $b_1$. If $b_1$ is a "one" the output of circuit 100 is $b_2'$, the inverse of the input digit $b_2$. If $b_1$ is a "zero" the output of circuit 100 is $b_2$. The output of circuit 100 is the reflected binary code equivalent, $g_2$, of the conventional binary code digit $b_2$.

Figure 4A:
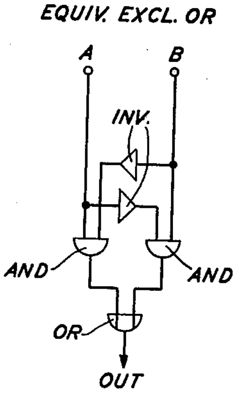

The exclusive OR circuit components and operation are described in detail in my application Serial No. 581,175, filed April 27, 1956. An equivalent circuit utilizing AND and OR logic circuits which may be employed is shown in Fig. 4*a*.

Figure 4B:
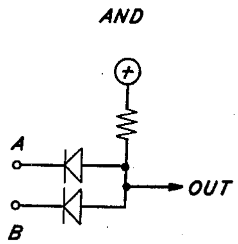
Figure 4C:
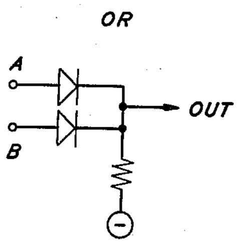
Figure 4D:
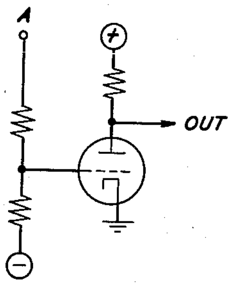
Figure 4D:
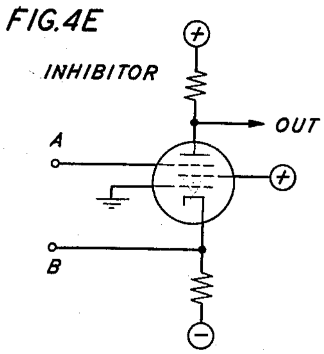

Figs. 4*b*, 4*c*, and 4*d* respectively illustrate typical AND and OR circuits utilizing diodes and an inverter circuit utilizing a triode. The balance of the logic components employed in the circuit of Fig. 2 may take these or comparable forms, as required.

Each of the AND circuits is arranged to provide an output "one" only if "one" signals are presented simultaneously at all of the inputs thereto. Each inverter provides an output "one" or "zero" signal equivalent to the inverse of the input "one" or "zero" signal thereto. Each OR circuit provides a "one" output signal if a "one" signal is present on at least one of the inputs thereto.

Corresponding digits of each number are applied to logic positions A . . . N, Fig. 2, in order of decreasing significance. Each position must compare the applied digit signals and interpret the comparison with reference to the more significant digit comparisons. Each position must recognize the most significant digit mismatch and thereafter initiate an output equivalent to the binary weighting assigned to the digit position contributing the most to the difference magnitude.

Having converted the conventional binary code number $b_1b_2 \ldots b_{n-1}b_n$ into the reflected binary code number $g_1g_2 \ldots g_{n-1}g_n$ in the circuit of Fig. 2*a*, or applying the number in the latter form directly to the circuit in Fig. 2*b*, the comparison with the reference number $a_1a_2 \ldots a_{n-1}a_n$ in conventional binary code form may proceed. In Fig. 2*b*, each position A . . . N comprises comparison, carry and output portions. The comparison portion of each position other than position A comprises an exclusive OR circuit, two inverters and two AND circuits. The carry portion of each position other than position A comprises two OR circuits, and the output portion of each position other than positions A and N comprises two OR circuits and two AND circuits.

A comparison of two distinct sets of input numbers will serve to demonstrate the operation of the circuit of Fig. 2. Assume, first, that the number 14 is to be compared with the number 5, the former being the reference number. Table IV illustrates the elements of the problem:

IV

| | | | 8 A | 4 B | 2 N−1 | 1 N |
|---|---|---|---|---|---|---|
| 14 | $a_1a_2a_{n-1}a_n$ | = | 1 | 1 | 1 | 0 |
| 5 | $b_1b_2b_{n-1}b_n$ | = | 0 | 1 | 0 | 1 |
| +9 | | | +x | | | |

| Weighting Position | | 8 A | 4 B | 2 N−1 | 1 N |
|---|---|---|---|---|---|
| $a_1a_2a_{n-1}a_n$ | = | 1 | 1 | 1 | 0 |
| $g_1g_2g_{n-1}g_n$ | = | 0 | 1 | 1 | 0 |

The correct resultant is positive 9. Thus the circuit of Fig. 2 must provide a positive relative magnitude output signal and a difference magnitude output signal having a binary weight which best approximates the resultant 9. Note that the compared numbers in conventional binary form reveal a positive mismatch in position A, the most significant digit position; i.e., $a_1=1$ *and* $b_1=0$. Comparison of the conventional binary code digits in position B reveals a match, so that in accordance with rule 1 stated hereinbefore, the circuit should provide a positive output having a binary weighting equivalent to that of position A. The weighting of 8 assigned to position A is the best available approximation of the correct resultant difference magnitude which can be provided by the weighting assigned any one digit position.

The circuit of Fig. 2*b* conducts the comparison of the number 14 in conventional binary code form $a_1a_2a_{n-1}a_n$ and the number 5 in reflected binary code form $g_1g_2g_{n-1}g_n$, and provides the approximate resultant of +8 in the following manner:

Position A receives a "one" and a "zero" on the respective $a_1$ and $g_1$ input leads, so that comparison AND circuit 205 receives a "one" on input lead 206 and a "one" on its other input from inverter 202. Similarly, comparison And circuit 200 receives a "zero" on its input lead 201 and a "zero" on its input lead from inverter 207. Thus, comparison AND circuit 205 delivers an output "one" signal over lead 208 to positive carry lead $c_1$ and over lead 214 to positive output AND circuit 215 while comparison AND circuit 200 fails to provide an output.

Position B receives the next most significant digits $g_2$ and $a_2$ of the two input numbers on input leads 221 and 231 respectively. In this example a "one" will appear on both of these input leads. Exclusive OR circuit 220 receives a "one" on input lead 221 from the $g_2$ input and a "one" on lead 222 from the $a_1$ input of position A. Having received the next more significant digit $a_1$ as a "one," the exclusive OR circuit 220 proceeds to convert the input digit $g_2$ from a "one" to a "zero" in its output which is connected to comparison AND circuit 225 and inverter 224. Thus, comparison AND circuit 230 in position B will receive a "one" from input $a_2$ over lead 231 and a "one" from inverter 224. With input "one" signals on both of its input leads, comparison AND circuit 230 will provide an output "one" through carry OR circuit 240 to positive carry lead $c_2$, thus providing a positive carry to comparison position N−1, if required. From the digit $a_2$ input in position B, a "one" signal passes over leads 231, 234 and 248, through OR circuit 250 and over lead 251 to positive output AND circuit 215 in position A. Having also received a "one" input on lead 214, positive output AND circuit 215 delivers an output signal to the positive difference magnitude output lead 290. This output signal is given the appropriate analog weighting (8) of position A in the $R_1$ portion of analog converter 295. Thus, the signal on output lead 290 indicates an approximate difference magnitude between the reference number 14 and the comparison number 5 of positive 8.

Only the output signal receiving the largest weighting is permitted to reach the final output leads. This may be accomplished by utilizing the largest signal to inhibit outputs from lesser significant digit positions by means of inhibit logic circuits 296 in Fig. 2 and 385 in Fig. 3.

Assume now that the numbers to be compared are 6 and 9, with 6 as the reference number. The significant information for this example is shown in Table V.

V

| | | | 8 A | 4 B | 2 N−1 | 1 N |
|---|---|---|---|---|---|---|
| 6 | $a_1a_2a_{n-1}a_n$ | = | 0 | 1 | 1 | 0 |
| 9 | $b_1b_2b_{n-1}b_n$ | = | 1 | 0 | 0 | 1 |
| −3 | | | − | | x | |

| Weighting Position | | 8 A | 4 B | 2 N−1 | 1 N |
|---|---|---|---|---|---|
| $a_1a_2a_{n-1}a_n$ | = | 0 | 1 | 1 | 0 |
| $g_1g_2g_{n-1}g_n$ | = | 1 | 1 | 0 | 1 |

The correct resultant is negative 3. Thus the circuit of Fig. 2 must provide a negative relative magnitude output signal and a difference magnitude output signal having a binary weight which best approximates the resultant 3.

Note that the most significant digits of the numbers, position A, in conventional binary code form are negatively mismatched; i.e., $a_1=0$ and $b_1=1$. The corresponding digits in succeeding less significant digit positions B and N−1 are positively mismatched; i.e., $a_2$ and $a_{n-1}=1$, and $b_2$ and $b_{n-1}=0$. According to rule 2 cited hereinbefore, an output indicating the approximate difference magnitude should be provided in accordance with the weighting assigned the last of a succession of positions immediately following the position having the most significant mismatched digits, if each of such succession of positions contains digit mismatches opposite thereto. In this example, a negative mismatch in position A is followed by positive mismatches in positions B and N−1 and another negative mismatch in position N. The last of the succession of opposite mismatches following the first mismatch occurs in position N−1 so that an output according to the binary weighting of position N−1, or 2, shall be provided.

The input number $b_1b_2b_{n-1}b_n$ again is converted to reflected binary code form in the circuit of Fig. 2*a* for application to the comparison circuit of Fig. 2*b*, so that the input signals on leads $g_1g_2g_{n-1}g_n$ are 1101. Thus, comparison And circuit 200 in position A provides an output "one" signal on lead 203 to negative carry lead $d_1$ and to negative output AND gate 210 over lead 209 responsive to the "one" on $g_1$ at one input thereof, and a "one" at the other input thereof from inverter 207 responsive to the "zero" on $a_1$.

The output of comparison AND circuit 200 signifies the existence of a negative mismatch in position A.

The input "one" at $g_2$ of position B is received by exclusive OR circuit 220 which in effect inverts digit $g_2$ if the digit $a_1$ is a "one." In this instance $a_1$ is a "zero" so that the "one" on $g_2$ in position B is passed to comparison AND circuit 225 and to inverter 224. The "one" signal on $a_2$ is received by inverter 232 which in turn provides a "zero" output signal to comparison AND circuit 225. With a "zero" signal at at least one input of each of comparison AND circuits 225 and 230, the latter receiving a "zero" from inverter 224, each of the AND gates 225 and 230 fails to provide an output signal. However, the negative carry signal on lead $d_1$ is passed through OR circuit 235, thus continuing the negative carry on lead $d_2$ to succeeding positions.

Negative output AND circuit 210 in position A receives the "zero" signal from inverter 232 over lead 244, through OR circuit 245 and over lead 246. Similarly, positive output AND circuit 215 fails to receive a "one" signal on its input lead 214 from comparison AND circuit 205. Thus, a difference magnitude output is not permitted in position A.

Output AND circuits 225 and 260, whose outputs are weighted in accordance with the weighting of position B, each receive at least one "zero" input signal; the former from the "one" $a_{n-1}$ digit input of position N−1 via inverter 272, lead 273, OR circuit 281 and lead 254 and the latter from positive carry lead $c_2$ over lead 258. Thus, a difference magnitude output having the weighting of position B is not permitted.

Position N−1 receives a "zero" $g_{n-1}$ input on lead 271. Exclusive OR circuit 270 inverts the "zero" on lead 271 responsive to the "one" on lead 234 from $a_2$, having no intervening comparison positions between B and N−1 in this example. Each of the comparison AND circuits 275 and 280 in position N−1 receives a "zero" on at least one of its respective input leads, so that, as in position B, the comparison AND circuits fail to provide "carry" output signals. The negative carry signal on lead $d_2$, which is $d_{m-2}$ in this instance, is passed through OR circuit 274 to negative carry lead $d_{n-1}$.

The $a_n$ digit in position N is a "zero" so that a "one" appears on one input of negative output AND circuit 285 in position N−1 via lead 282, inverter 283, lead 284, OR circuit 286 and lead 287. Negative output AND circuit 285 also receives a "one" signal on its other input lead 279 from negative carry lead $d_{n-1}$. The consequent output signal of negative output AND circuit 285 is weighted in analog converter 295 in accordance with the binary weighting assigned position N−1, or 2, and passed to the negative difference magnitude output lead 291. Thus, the signal on output lead 291 indicates an approximate difference magnitude between the reference number 6 and the comparison number 9, of negative 2. The output signal will appear only on one of the output leads 290 and 291 thus indicating the relative magnitude of the numbers as well, assuming at the outset that $a_1a_2 \ldots a_{n-1}a_n$ is the reference number.

It may be appreciated that considerable variation in the arrangement and form of logical components is possible to produce the desired results. The principal factors to be considered are speed of operation, reliability, cost, size, power required, maintenance and adaptability to changes. The circuit presented in Fig. 2 does not necessarily rate highest in each factor, but rather possesses features best lending themselves to illustration of the application of logic circuitry to the problem.

Fig. 3 illustrates a circuit which approaches the problem in a slightly different manner but achieves the same result. The circuit of Fig. 3 provides an output on one lead signifying the relative magnitude of the compared numbers and an output on another lead indicating the approximate difference magnitude. As in the circuit of Fig. 2, this circuit may be used to compare a conventional binary code number $a_1a_2 \ldots a_{n-1}a_n$ with a reflected binary code number $g_1g_2 \ldots g_{n-1}g_n$. If two conventional binary code numbers are to be compared, the circuitry of Fig. 2*a* may be utilized to convert one of the numbers $b_1b_2 \ldots b_{n-1}b_n$ into reflected binary code before insertion in the circuitry of Fig. 3.

One of the two output leads common to each position A . . . N provides an indication of the relative magnitude of the compared numbers, while the other output lead provides an indication of the approximate difference between them. The digit comparison position receiving the most significant digit mismatch will transmit or prohibit transmission of a signal to the relative magnitude output lead to indicate a mismatch of one polarity or the opposite polarity respectively. In this fashion the relative magnitude or sign of the difference between the compared numbers may be indicated by the presence or absence of a signal on a distinct output lead. The other output lead from each comparison position is connected through means forming a distinct analog binary weighting for that position, thereby indicating the approximate difference magnitude. The arrangement of logic components determines which comparison position will transmit an output signal on the latter output lead so as to provide the best approximation of the difference magnitude.

The logic expressed in Boolean Algebra for the circuit of Fig. 2 applies to the circuit of Fig. 3 with the following additions: output $i = w_i + v_i$, positive sign$=c_id_i'$ for most significant mismatch position, and negative sign$=c_i'd_i$ for most significant mismatch position.

The comparison portion of each position in Fig. 3 is identical to that of each position of the embodiment of Fig. 2 but utilizes an inhibitor circuit and one additional OR circuit in the output portion of each position. A simple inhibitor circuit is illustrated in Fig. 4*e* comprising a pentode arranged such that a "one" signal on one input lead will generate a "one" signal on the single output lead only in the absence of a "one" signal on a second input (inhibit) lead.

A comparison of two distinct sets of input numbers will serve to demonstrate the operation of the circuit of Fig. 3. Assume, first, that the compared numbers are 14 and 6, with 14 as the reference number. The pertinent information is shown in Table VI.

*VI*

| | | | 8 A | 4 B | 2 N−1 | 1 N |
|---|---|---|---|---|---|---|
| 14 | $a_1a_2a_{n-1}a_n$ | = | 1 | 1 | 1 | 0 |
| 6 | $b_1b_2b_{n-1}b_n$ | = | 0 | 1 | 1 | 0 |
| +8 | | | +x | | | |

| Weighting Position | | 8 A | 4 B | 2 N−1 | 1 N |
|---|---|---|---|---|---|
| $a_1a_2a_{n-1}a_n$ | = | 1 | 1 | 1 | 0 |
| $g_1g_2g_{n-1}g_n$ | = | 0 | 1 | 0 | 1 |

The resultant +8 is approximated in this example by providing a positive relative magnitude output signal and a difference magnitude output signal from the position A having a weighting of 8. Note that in conventional binary code form the most significant digit of the former number, position A, is a "one" and of the latter number a "zero," or a positive mismatch considering the former number as the reference number. The digit of next lower significance in each number, position B, is a "one" providing a match, and in accordance with the rules cited hereinbefore, a positive mismatch followed by a match should produce a positive output having the analog binary weighting of the mismatch position.

The input number $b_1b_2b_{n-1}b_n$ is converted to reflected binary code form $g_1g_2g_{n-1}g_n$ by the circuit of Fig. 2*a*, or, optionally, is applied directly to the circuit in Fig. 3 in the latter form, as shown. Position A receives a "one" on $a_1$ and a "zero" on $g_1$. Thus, comparison AND circuit 305 in position A provides an output "one" signal on lead 302 responsive to a "one" from inverter 301 at one input and a "one" from $a_1$ at the other input. An output "one" on lead 302 represents a positive carry on lead $c_1$ and a positive relative magnitude indication on output lead 304. Comparison AND circuit 310 receives a "zero" from $g_1$ at one input and a "zero" from inverter 300 at its other input and thus fails to provide an output signal to negative carry lead $d_1$.

Output AND circuit 315 in position A provides an output "one" to OR circuit 320 responsive to input "one" signals from comparison AND circuit 305 over leads 302, $c_1$ and 306 and from the "one" input digit signal $a_2$ in position B over leads 307 and 308 and through OR circuit 309. OR circuit 320, in turn, provides an output on lead 321 which is given the analog binary weighting of position B over leads 307 and 308 and through OR circuit proximate difference between the compared numbers. Position A in a four digit number comparison is assigned a binary weighting of 8, so that an output signal from position A on lead 321 receives an analog weighting of 8 in section $R_A$ of analog converter 380.

Only the output signal receiving the largest weighting is accepted. If outputs should occur in lesser significant digit positions, they may be inhibited by an appropriate arrangement of logic components so that only a signal from the most significant digit position among the positions providing output signals will be permitted to reach the final difference magnitude output lead 325. In this example, the weighted signal on difference magnitude output lead 325 indicates that the reference number (14) differs from the second number (6) by approximately eight, and the signal on relative magnitude output lead 304 from lead 302 in position A indicates that the reference number is larger than the second number. The combined resultant thus is positive 8.

Assume now that the compared numbers are 7 and 9, with 7 as the reference number. The pertinent data is shown in Table VII.

VII

| | | | 8<br>A | 4<br>B | 2<br>N−1 | 1<br>N | Weighting<br>Position | | 8<br>A | 4<br>B | 2<br>N−1 | 1<br>N |
|---|---|---|---|---|---|---|---|---|---|---|---|---|
| 7 | $a_1a_2a_{n-1}a_n$ | = | 0 | 1 | 1 | 1 | $a_1a_2a_{n-1}a_n$ | = | 0 | 1 | 1 | 1 |
| 9 | $b_1b_2b_{n-1}b_n$ | = | 1 | 0 | 0 | 1 | $g_1g_2g_{n-1}g_n$ | = | 1 | 1 | 0 | 1 |
| −2 | | | − | | x | | | | | | | |

The resultant −2 in this example is approximated by providing a negative relative magnitude output signal and a difference magnitude output signal from the position N−1 having a weighting of 2. Note that in conventional binary code form the most significant digit of the former number, $a_1$, is a "zero" and of the latter number, $b_1$, a "one," or a negative mismatch considering the former number as the reference number. The digit of next lower significance is a "one" in the former number and a "zero" in the latter number, or a positive mismatch. In accordance with rule 2 cited hereinbefore, an output is provided in accordance with the weighting assigned the last oppositely mismatched digit position following the most significant digit mismatch in this example, or position N−1. Also the output should be negative, since the most significant digit mismatch is negative.

The input number $b_1b_2b_{n-1}b_n$ again is converted to reflected binary code form for application to the circuit of Fig. 3 so that input signals on $g_1g_2g_{n-1}$ and $g_n$ are 1, 1, 0 and 1, respectively. Thus, comparison AND circuit 310 in position A provides an output "one" signal on lead 311 responsive to a "one" from $g_1$ at one input thereof, and a "one" signal at the other input thereof from inverter 300 responsive to a "zero" signal from $a_1$. An output "one" on lead 311 represents a negative carry on lead $d_1$ and a negative relative magnitude.

A change in signal condition on final output lead 304 during a number comparison signifies a positive relative magnitude while absence of a change indicates a negative relative magnitude. Thus the "one" on lead 311 serves to activate inhibitor circuits 330, 350 and 390 in lesser significant digit positions via the negative carry leads $d_2$, $d_{n-1}$ and $d_n$ so as to prevent possible signal changes in lead 304 due to positive mismatches in such digit positions.

Output AND circuit 316 in position A receives the negative carry "one" signal over leads $d_1$ and 312 but receives a "zero" signal at its other input responsive to the "one" input digit signal $a_2$ in position B via inverter 317, lead 318 and OR circuit 319. Similarly output AND circuit 315 receives the "one" input digit signal $a_2$ via leads 307 and 308 and OR circuit 309 but fails to receive a "one" signal over its other input lead 306 so that no difference magnitude output is permitted in position A.

The input "one" at $g_2$ of position B is received by exclusive OR circuit 331 which, in effect, inverts the digit $g_2$ if the digit $a_1$ is a "one." In this instance $a_1$ is a "zero" so that the "one" on $g_2$ in position B is passed over output lead 332 to inverter 333 which in turn provides a "zero" to comparison AND circuit 335. The "one" signal on $a_2$ is received by inverter 317 which in turn provides a "zero" signal to comparison AND circuit 334. With a "zero" signal at at least one input thereto, each of the comparison AND circuits 334 and 334 fails to provide an output signal. However, the negative carry signal on lead $d_1$ is passed through OR circuit 337 in position B to negative carry lead $d_2$.

Each of the output AND gates 345 and 346 in position B receives a "zero" input signal in the same manner as those in position B so that no difference magnitude output is permitted in position B.

Position N−1 receives a "zero" input on $g_{n-1}$ and a "one" input on $a_{n-1}$. Exclusive OR circuit 351 inverts the "zero" on $g_{n-1}$ responsive to the "one" on lead 307 from $a_2$. Each of the comparison AND circuits 354 and 355 in position N−1 receives a "zero" on one of its respective input leads so that, as in position B, the parallel comparison AND circuits fail to provide "carry" output signals. The negative carry "one" signal from position A on lead $d_2$ is passed through the carry OR circuit 357 of position N−1, over negative carry lead $d_{n-1}$, and lead 364 to output AND circuit 360.

Position N receives a "one" input on $a_n$ and on $g_n$. Exclusive OR circuit 365 inverts the "one" on $g_n$ responsive to the "one" on lead 352 from $a_{n-1}$. Comparison AND circuit 370 thus receives "ones" from $a_n$ and inverter 366 and provides an output "one" to positive carry lead $c_n$ through carry OR circuit 371. Inhibitor 390 receives the positive carry signal on $c_n$ and prevents its passage to the relative magnitude output lead due to the negative carry signal $d_n$ at the inhibit input thereof. The positive carry signal also passes through OR circuit 372 to output AND circuit 360 which responds "one" signals on each of its inputs to provide an output "one" through OR circuit 363 to the $R_c$ section of analog converter 380. The consequent difference magnitude output signal on lead 325 is weighted in accordance with the binary weighting (2) assigned position N−1.

Thus, the signal on difference magnitude output lead 325 indicates an approximate difference between the reference number (7) and the comparison number (9) of 2. Absence of a signal on relative magnitude output lead 304 indicates that the reference number is smaller than the compared number. The combination provides a resultant of 2.

In this instance, it is to be noted that position N, comparing the least significant digits, does not provide an independent output for the difference magnitude. In order to permit this circuit to indicate a difference magnitude for this position; i.e., an equality of compared numbers or a difference of one, the difference magnitude output lead 325 normally carries a binary weighting of 1. Each position thus adds a 1 weighting to its assigned binary weighting to provide the approximate difference magnitude. The resultant in the last example, therefore, would be −3 rather than −2.

It is to be understood that the above-described arrangements are illustrative of the application of the principles of the invention. Numerous other arrangements may be devised by those skilled in the art without departing from the spirit and scope of the invention.

What is claimed is:

1. An electrical circuit for comparing two binary numbers comprising a plurality of distinct comparison circuits each corresponding to a distinct digit position in the binary numbers for detecting various combinations of digits applied thereto, said combinations being equivalent to matches and mismatches of said digits in conventional binary code form, means for applying digits of like significance in said binary numbers to individual of said comparison circuits, output means connected to said comparison circuits, means responsive to detection of a first combination of said digits by a first comparison circuit to enable a first of said output means, and means for further enabling said first output means upon detection of said first combination or a second combination of said digits applied to the next less significant digit position, whereby an output signal is provided by said first output means indicative of the approximate magnitude of the difference between said two binary numbers being compared.

2. An electrical circuit for comparing two binary numbers comprising a plurality of distinct comparison circuits each corresponding to a distinct digit position in the binary numbers for detecting first, second and third combinations of digits applied thereto, said combinations being equivalent respectively to a mismatch in one direction, a mismatch in the opposite direction and a match of the digits in conventional binary code form, means for applying digits of like significance in said binary numbers to individual of said comparison circuits, output means corresponding to each digit position in the binary numbers connected to said comparison circuits, means responsive to detection of a first combination of said digits by a first comparison circuit to enable a first output means, and means for further enabling said first output means upon detection by the next less significant digit comparison circuit of said first combination or said third combination of said digits applied thereto, whereby an output signal is provided by said first output means indicative of the approximate magnitude of the difference between said two binary numbers being compared.

3. An electrical circuit in accordance with claim 2 and further comprising distinct weighting means connected to each of said output means and having respective values related to the significance of the corresponding digit position whereby distinct weightings are imparted to output signals received from said output means.

4. An electrical circuit in accordance with claim 3 and further comprising a first output terminal and inhibit means connected between said distinct weighting means and said output terminal whereby only the largest of said weighted output signals is transmitted to said first output terminal indicative of the approximate magnitude of the difference between said two binary numbers being compared.

5. An electrical circuit in accordance with claim 4 and further comprising a second output terminal, means connecting said second output terminal to each of said comparison circuits, and inhibit means associated with said connecting means whereby the signal condition of said second output terminal is indicative of the sign of the difference between said two binary numbers being compared.

6. An electrical circuit in accordance with claim 3 and further comprising first and second output terminals, means connected from each of said distinct weighting means to said output terminals, said connecting means arranged to transmit only the largest of said weighted output signals to a selected one of said output terminals indicative of the relative magnitude and approximate magnitude of the difference between said two binary numbers being compared.

7. An electrical circuit for comparing two binary numbers comprising a distinct comparison circuit corresponding to each digit position in the binary numbers for detecting various combinations of like significance digits of said numbers applied thereto, said combinations being equivalent to matches and mismatches of said digits in conventional binary code form, output means corresponding to each digit position of the binary numbers connected to said comparison circuits, means responsive to detection of a first combination of said digits by a first one of said comparison circuits to enable the corresponding and less significant digit position output means, means for further enabling said corresponding digit position output means when the next less significant digit comparison circuit detects said first combination or a second combination of said digits applied thereto, and means responsive to detection of a third combination of said digits by each of a series of said comparison circuits following said first comparison circuit in order of decreasing significance to further enable the output means in the digit position of the least significant of said series of comparison circuits, whereby an output signal is produced by said output means indicative of the approximate magnitude of the difference between said two binary numbers being compared.

8. An electrical circuit for comparing two binary numbers comprising a plurality of distinct comparison circuits each corresponding to a distinct digit position in the binary numbers for detecting first, second and third combinations of digits applied thereto, said combinations being equivalent respectively to a mismatch in one direction, a mismatch in the opposite direction and a match of the digits in conventional binary code form, means for applying digits of like significance in said binary numbers to individual of said comparison circuits, output means corresponding to each digit position in the binary numbers connected to said comparison circuits, means responsive to detection of a first combination of said digits by a first comparison circuit to enable said output means in the same and less significant digit positions, means for further enabling said output means in said same digit position upon detection by the next less significant digit comparison circuit of said first combination or said third combination of said digits applied thereto, and means responsive to detection of said second digit combination by each of a series of comparison circuits following said first comparison circuit in order of decreasing significance to further enable the output means connected to the least significant of said series of comparison circuits, whereby an output signal is provided by said output means indicative of the approximate magnitude of the difference between said two binary numbers being compared.

9. An electrical circuit for comparing two binary numbers comprising a plurality of distinct comparison circuits, means for applying digits of like significance in said binary numbers to individual of said comparison circuits, distinct output means for each digit position in the binary numbers, first means connected from each comparison circuit to the output means corresponding to the same and less significant digit positions, second means connected from each comparison circuit to the output means corresponding to a more significant digit position, and means in said comparison circuits for detecting a plurality of input digit conditions equivalent to a mismatch in one direction, and a mismatch in the opposite direction or a match of the digits in conventional binary code form, one of said comparison circuits applying a signal to said first connecting means upon detection of a first input digit condition, a less significant digit comparison circuit applying a signal to said second connecting means upon detection of said first input digit condition or a second input digit condition, said output means responsive to signals received over said first and second connecting means to provide output signals, the most significant one of said output signals being indicative of the magnitude of the difference between the two binary numbers being compared.

10. An electrical circuit for comparing two binary numbers comprising a plurality of distinct comparison circuits, means for applying digits of like significance in said binary numbers to individual of said comparison circuits, distinct output indicating means corresponding to each digit position of said binary numbers, means in said comparison means responsive to certain input digit combinations to apply signals to selected of said distinct output indicating means as determined by the comparison circuits, means in said output indicating means responsive to receipt of certain combinations of said signals to provide outputs of distinct significance in accordance with the significance of the corresponding digit positions of the compared binary numbers, an output lead, means connecting all of said distinct output indicating means to said output lead, and means in said connecting means to permit transmission over said output lead of only the most significant output from said output indicating means indicative of the approximate magnitude of the difference between said binary numbers being compared.

11. An electrical circuit for comparing two binary numbers comprising a plurality of distinct comparison circuits, means for applying digits of like significance in said binary numbers to individual of said comparison circuits, distinct output indicating means corresponding to each digit position of said binary numbers, means connecting said comparison circuits to said output indicating means including means connected from each comparison circuit to the output indicating means corresponding to less significant digit positions, means in said comparison means responsive to certain input digit combinations to apply signals through said connecting means to said output indicating means, and means in said output indicating means responsive to receipt of certain combinations of said signals to provide outputs of distinct significance in accordance with the significance of the corresponding digit positions, the most significant of said outputs being indicative of the approximate difference magnitude of the binary numbers being compared.

12. An electrical circuit for comparing two binary numbers comprising a distinct comparison circuit for each digit position in the binary numbers, means for applying digits of like significance in said binary numbers to the comparison circuit identified with the position of said applied digits, distinct output indicating means corresponding to each digit position in the binary numbers, first means connected from each comparison circuit to the output indicating means corresponding to the same and less significant digit positions, second means connected from each comparison circuit to the output indicating means corresponding to a more significant digit position, and means in said comparison circuits for applying signals to said first and second connecting means responsive to certain input digit combinations, said output indicating means responsive to signals received over said first and second connecting means to provide output signals, the most significant one of said output signals being indicative of the magnitude of the difference between the two binary numbers being compared.

13. An electrical circuit in accordance with claim 12 and further comprising distinct weighting means connected to each of said output indicating means and having respective values related to the significance of the corresponding digit position whereby distinct weightings are imparted to output signals received from said output indicating means.

14. An electrical circuit in accordance with claim 13 wherein said weighting means comprises analog conversion means.

15. An electrical circuit in accordance with claim 13 and further comprising a first output terminal and inhibit means connected between said distinct weighting means and said output terminal whereby only the largest of said weighted output signals is transmitted to said first output terminal indicative of the approximate magnitude of the difference between said two binary numbers being compared.

16. An electrical circuit in accordance with claim 15 and further comprising a second output terminal connected to said first connecting means from each of said comparison circuits, and inhibit means associated with said first and second connecting means whereby the signal condition of said second output terminal is indicative of the relative magnitude of said two binary numbers being compared.

17. An electrical circuit in accordance with claim 13 and further comprising first and second output terminals, third means connected from each of said distinct weighting means to said output terminals, said third connecting means arranged to transmit only the largest of said weighted output signals to a selected one of said output terminals indicative of the relative magnitude and approximate magnitude of the difference between said two binary numbers being compared.

18. An electrical circuit in accordance with claim 17 wherein said third connecting means comprises inhibit means activated by said weighted output signals from more significant output indicating means.

19. An electrical circuit in accordance with claim 12 wherein said first connecting means comprise first and second signal paths and said second connecting means comprise third and fourth signal paths, said distinct output means being enabled by concurrent receipt of signals on said first and third signal paths or said second and fourth signal paths.

20. An electrical circuit in accordance with claim 19 wherein said distinct output indicating means comprise first and second coincidence logic circuits, said first coincidence logic circuit being connected to first and third signal paths and said second coincidence logic circuit being connected to second and fourth signal paths.

21. An electrical circuit in accordance with claim 20 wherein each of said distinct comparison circuits comprises first and second coincidence logic circuits connected to the respective first and second signal paths, each of said comparison circuit coincidence logic circuits being arranged to receive representations of the like significance input digits and responsive to certain combinations of said input digit representations to apply a signal to the associated signal path.

22. An electrical circuit in accordance with claim 21 wherein each of said distinct comparison circuits comprises first and second logical OR circuits connected to the respective third and fourth signal paths, said first logical OR circuit being arranged to receive signals from said first signal path and one of the input digits applied to the distinct comparison circuit, said second logical OR circuit being arranged to receive signals on said second signal path and the inverse of said one of the input digits applied to the distinct comparison circuit.

23. An electrical circuit for comparing two binary numbers comprising a distinct comparison circuit for each digit position in the binary numbers, means for applying digits of like significance in said binary numbers to the comparison circuit for the corresponding digit position, distinct output indicating means for each digit position in the binary numbers including weighting means having the significance of the corresponding digit position, first means connected from each comparison circuit to the output indicating means for the same and less significant digit positions, second means connected from each comparison circuit to the output indicating means for a more significant digit position, and means in said comparison circuits for applying signals to said first and second connecting means responsive to certain input digit combinations, said output indicating means responsive to signals received through said first and second connecting means to provide output signals weighted in accordance with the significance of the assigned digit position.

24. An electrical circuit for comparing two binary numbers comprising a plurality of distinct comparison circuits, means for applying digits of the same significance in said binary numbers to individual of said comparison circuits, distinct output indicating means corresponding in significance to individual of the digit positions in said binary numbers, first means connected from each comparison circuit to the output indicating means corresponding to the same and all less significant digit positions, second means connected from each comparison circuit to the output indicating means corresponding to the next more significant digit position, and means in said comparison circuits for applying signals to said first and second connecting means, said output indicating means responsive to signals received through said first and second connecting means to provide output signals, a selected one of said output signals being indicative of the approximate magnitude of the difference between said binary numbers being compared.

25. A system for comparing equal length multiple element binary code numbers in which element values are characterized by one or the other of two possible signaling conditions comprising a distinct comparison circuit for each pair of digit elements of corresponding significance in the binary code numbers, a pair of carry signal leads linking each of said comparison circuits to all lesser significant digit comparison circuits, a plurality of output means connected to individual of said comparison circuits and to one of said pair of carry leads, one of said comparison circuits responsive to receipt of certain of a plurality of possible element valued combinations to transmit a signal over one of said carry leads, one of said output means responsive to receipt of said carry signal in conjunction with a signal from said connected comparison position to provide an output signal indicative of the approximate difference magnitude of said compared numbers.

26. An electrical circuit for comparing two binary numbers comprising a plurality of distinct comparison circuits, means for applying digits of like significance in said binary numbers to individual of said comparison circuits, distinct output means corresponding to each of said comparison circuits, an output lead connected to all of said output means, means in said comparison circuits for generating first and second signals responsive to certain input digit combinations, means for applying said first signal from one of said comparison circuits to said corresponding output means and to each of said output means corresponding to less significant digit comparison circuits, and means for applying said second signal from one of said less significant digit comparison circuits to said output means corresponding to a more significant digit comparison circuit, said output means responsive to concurrent receipt of said first and second signals to apply an output signal to said output lead indicative of the approximate magnitude of the difference between said two binary numbers being compared.

27. An electrical circuit for comparing two binary numbers comprising a plurality of distinct comparison circuits generating first and second signals in response to certain input digit combinations, means for applying digits of like significance in said binary numbers to individual of said comparison circuits, distinct output means comprising a coincidence logic circuit for each of said comparison circuits, means for applying said first signal from one of said comparison circuits to a corresponding one of said output means and to each of said output means corresponding to less significant digit comparison circuits, and means for applying said second signal from one of said less significant digit comparison circuits to said output means corresponding to a more significant digit comparison circuit, coincidence of one of said first signals and one of said second signals in one of said output means enabling the logic circuit therein to applying an output signal to said output lead indicative of the approximate difference magnitude of the compared binary numbers.

References Cited in the file of this patent

UNITED STATES PATENTS

| | | |
|---|---|---|
| 2,318,591 | Couffignal | May 11, 1943 |
| 2,364,540 | Luhn | Dec. 5, 1944 |
| 2,540,442 | Grosdoff | Feb. 6, 1951 |
| 2,749,440 | Cartwright | June 5, 1956 |
| 2,763,432 | York | Sept. 18, 1956 |

FOREIGN PATENTS

| | | |
|---|---|---|
| 1,005,754 | France | Jan. 2, 1952 |

OTHER REFERENCES

De Turk et al.: Basic Circuitry of the Midac and Midsac, University of Michigan Engineering Research Institute (Ypsilanti, Michigan), May 1954 (pages II-10 and II-11.)